US008696180B2

(12) United States Patent
Ishida et al.

(10) Patent No.: US 8,696,180 B2
(45) Date of Patent: Apr. 15, 2014

(54) VEHICLE LAMP

(75) Inventors: Hiroyuki Ishida, Shizuoka (JP); Naoki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 89 days.

(21) Appl. No.: 13/224,367

(22) Filed: Sep. 2, 2011

(65) Prior Publication Data

US 2012/0057363 A1 Mar. 8, 2012

(30) Foreign Application Priority Data

Sep. 6, 2010 (JP) ................................ 2010-199113

(51) Int. Cl.

*B60Q 1/00* (2006.01)
*F21V 1/00* (2006.01)
*F21V 7/00* (2006.01)
*F21V 5/00* (2006.01)
*B60Q 3/00* (2006.01)

(52) U.S. Cl.

USPC ........... 362/507; 362/509; 362/516; 362/520; 362/522; 362/538

(58) Field of Classification Search

USPC ......... 362/459, 487, 509, 516–518, 520, 522, 362/523, 539, 296.01, 297–303, 305, 307, 362/326–329, 335–337, 341, 346, 350

See application file for complete search history.

(56) References Cited

U.S. PATENT DOCUMENTS

| | | | | |
|---|---|---|---|---|
| 2,683,394 | A * | 7/1954 | Polanyi et al. | 359/729 |
| 7,070,312 | B2 * | 7/2006 | Tatsukawa | 362/545 |
| 7,181,378 | B2 * | 2/2007 | Benitez et al. | 703/2 |
| 7,244,924 | B2 * | 7/2007 | Kiyomoto et al. | 250/216 |
| 7,275,841 | B2 * | 10/2007 | Kelly | 362/345 |
| 7,404,655 | B2 * | 7/2008 | Walser et al. | 362/494 |
| 7,416,322 | B2 * | 8/2008 | Tanaka et al. | 362/514 |
| 2009/0003010 | A1 * | 1/2009 | Yagi | 362/520 |
| 2010/0020538 | A1 * | 1/2010 | Schulz et al. | 362/235 |

FOREIGN PATENT DOCUMENTS

JP 2009-224303 A 10/2009

* cited by examiner

*Primary Examiner* — Jong-Suk (James) Lee
*Assistant Examiner* — Alexander Garlen
(74) *Attorney, Agent, or Firm* — Sughrue Mion, PLLC

(57) ABSTRACT

A vehicle lamp includes a semiconductor light emitting device arranged to face toward a front of the vehicle lamp, a first optical member disposed in front of the semiconductor light emitting device, and a second optical member disposed in front of the first optical member. The first optical member comprises a front surface and a back surface. The front surface is configured to internally reflect light from the semiconductor light emitting device toward the back surface. The back surface is configured to internally reflect the light reflected by the front surface back toward the front surface such that the light exits the first optical member from the front surface. The second optical member is disposed directly in front of the front surface of the first optical member and diffuses the light from the first optical member to form a light distribution pattern.

13 Claims, 6 Drawing Sheets

VEHICLE LAMP

CROSS-REFERENCE TO RELATED APPLICATION

The present application claims priority from Japanese Patent Application No. 2010-199113 filed on Sep. 6, 2010, the entire content of which is incorporated herein by reference.

FIELD OF INVENTION

The present invention relates to a vehicle lamp having a semiconductor light emitting device and an optical member disposed in front of the semiconductor light emitting device to form a light distribution pattern ahead of the lamp.

DESCRIPTION OF RELATED ART

Recently, a semiconductor light emitting device, such as a light emitting diode, having a planar light emitting portion is being used as a light source of a vehicle lamp. For example, some vehicle headlamps are configured such that light emitted from the semiconductor light emitting device is controlled to be reflected and diffused using a reflector and a convex lens so as to form a light distribution pattern having a cutoff line on the upper side thereof. However, the thickness and the focal length of the convex lens require a certain space in the front-rear direction of the lamp.

To reduce a size in the front-rear direction of the lamp, a related art lamp unit has a semiconductor light emitting device and an optical member disposed such that light from the semiconductor light emitting device enters optical member (see, e.g., JP 2009-224303 A).

The semiconductor light emitting device serving as the light source of the related art lamp unit has a light emitting chip. The semiconductor light emitting device is disposed such that the light emitting chip is oriented to face forward. The optical member is configured such that light from the semiconductor light emitting device is internally reflected by a portion of a front surface of the optical member, internally reflected again by a back surface of the optical member, and exits from another portion of the front surface of the optical member.

The front surface of the optical member has a flat surface that is perpendicular to the optical axis, and the back surface of the optical member is configured as a light reflection control surface which is formed based on a paraboloid. The optical member has a mirrored surface to internally reflect the light from the semiconductor light emitting device.

According to the related lamp unit described above, the light reflection control surface is formed in accordance with a single specification. That is, the configuration of the light reflection control surface on the back of the optical member is different for each specification. Further, to form a light distribution pattern for a certain specification, it has been difficult to improve efficiency of use of the light from the light source.

BRIEF SUMMARY

Illustrative aspects of the present invention provide a vehicle lamp having an optical member that is compatible with multiple specifications, and capable of improving efficiency of use of light from a light source.

According to an illustrative aspect of the present invention, a vehicle lamp is provided. The vehicle lamp includes a semiconductor light emitting device arranged to face toward a front of the vehicle lamp, a first optical member disposed in front of the semiconductor light emitting device, and a second optical member disposed in front of the first optical member. The first optical member comprises a front surface and a back surface. The front surface is configured to internally reflect light from the semiconductor light emitting device toward the back surface. The back surface is configured to internally reflect the light reflected by the front surface back toward the front surface such that the light exits the first optical member from the front surface. The second optical member is disposed directly in front of the front surface of the first optical member and diffuses the light from the first optical member to form a light distribution pattern.

Other aspects and advantages of the invention will be apparent from the following description, the drawings and the claims.

DETAILED DESCRIPTION

Hereinafter, exemplary embodiments of the present invention will be described in detail. However, the following exemplary embodiments do not limit the scope of the claimed invention.

Figure 1:
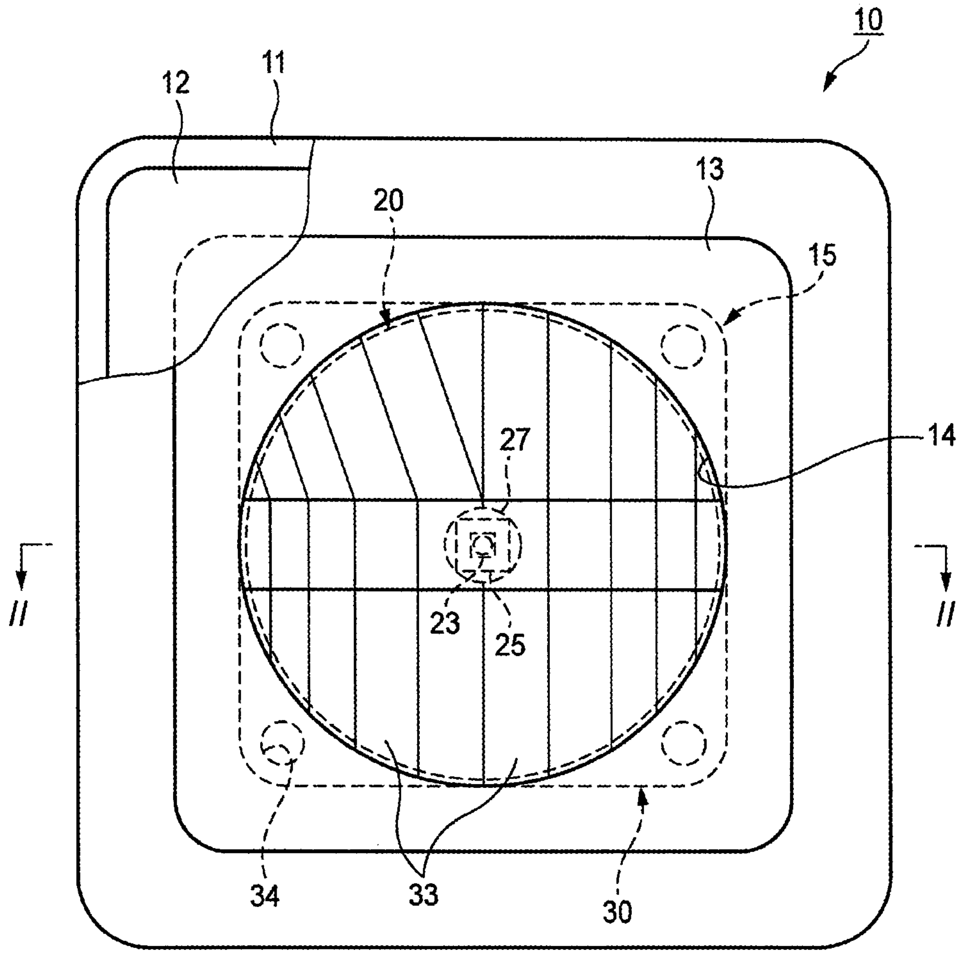
FIG. 1 is a front view of a vehicle lamp according to a first exemplary embodiment of the present invention.
Figure 2:
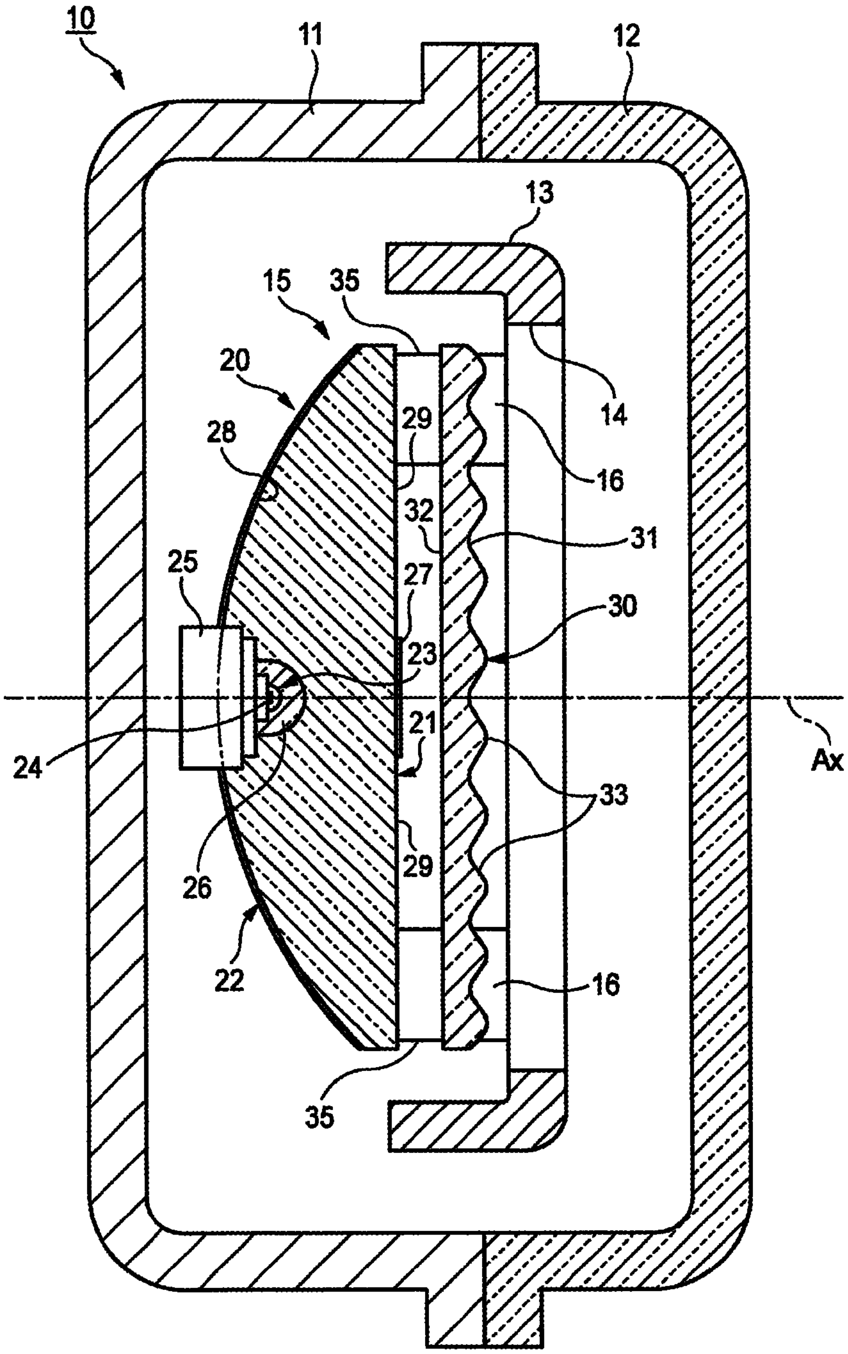
FIG. 2 is a sectional view taken along the line II-II of FIG. 1.

A vehicle lamp according to a first exemplary embodiment of the present invention is a headlamp which is mounted on a front end portion of a vehicle. As shown in FIGS. 1 and 2, the headlamp 10 has a lamp body 11, a transparent cover 12 attached to the lamp body 11 to cover an front opening of the lamp body 11, a lamp unit 15 disposed inside a lamp chamber formed by the lamp body 11 and the transparent cover 12, and a unit holder 13 holding the lamp unit 15.

The unit holder 13 is a plate member, and is formed along the outer shape of the transparent cover 12. The unit holder 13 is supported by the lamp body 11 via an aiming mechanism (not shown) such that an angle of the unit holder 13 with respect to the lamp body 11 can be adjusted vertically and laterally. The unit holder 13 has a circular opening 14 at a location corresponding to the lamp unit 15, and four bosses 16 provided around the circular opening 14. Each of the bosses 16 is protruded rearward. The lamp unit 15 is fastened to the four bosses 16 by screws.

The lamp unit 15 includes a light source 23, a first optical member 20 disposed in front of the light source 23 such that light from the light source 23 enters the first optical member 20, and a second optical member 30 disposed in front of the first optical member 20. The light source 23 is a semiconductor light emitting device, such as a light emitting diode, and is oriented to face toward the front of the lamp The light source 23 has a rectangular light emitting chip 24 mounted on a substrate, and a semispherical sealing resin member covering the light emitting chip 24. The light source 23 is supported by a support block 25 via the substrate.

The first optical member 20 is an molded article made of a transparent synthetic resin such as an acrylic resin. The first optical member 20 has a front surface 21 and a back surface 22. The front surface 21 has a flat surface that is perpendicular to an optical axis Ax extending in the front-rear direction of the lamp. The front surface 21 includes a central reflecting portion 27 and an outer reflecting portion 29 formed around the central reflecting portion 27. The central reflecting portion 27 is formed in a circular area around the optical axis Ax; and has a mirrored surface 28. The mirrored surface 28 is formed by, for example, aluminum deposition. The central reflecting portion 27 is arranged such that an incidence angle of the light from the light source 23 with respect to the front surface 21 is substantially the same as a critical angle θ0 at an outer boundary of the central reflecting portion 27 (see FIG. 3).

Figure 3:
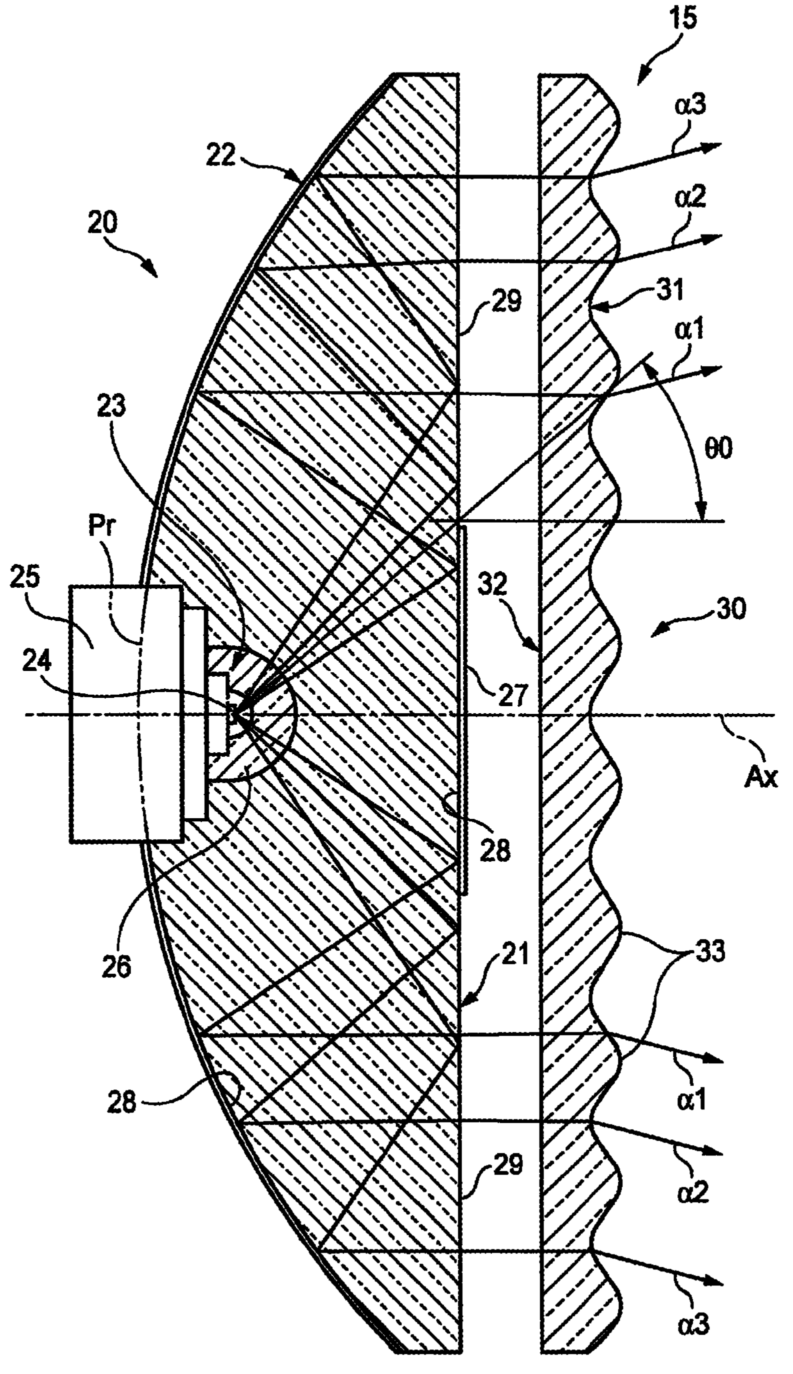
FIG. 3 is an enlarged view of a portion of a lamp unit of FIG. 2.

The back surface 22 of the first optical member 20 is configured as paraboloid Pr having its center on the optical axis Ax, and has a mirrored surface 28 over the entire area of the back surface 22 (see FIG. 3). The mirrored surface 28 is formed by, for example, aluminum deposition. A semispherical recess is formed on the back side of the first optical member 20 to surround the light emitting center of the light source 23. The recess may be is filled with a transparent material 26, e.g., epoxy resin, or may be hollow. A plurality of tabs is provided on the outer peripheral portion of the first optical member 20, and each of the tabs is formed with a screw hole. By inserting screws through the respective screw holes, the tabs are fastened to the respective bosses 35 provided on the second optical member 30.

The second optical member 30 is a molded article and is made of a transparent synthetic resin such as an acrylic resin. The second optical member 30 is disposed near the front surface 21 of the first optical member 20, and diffuses light from the first optical member 20 to form a given light distribution pattern in front of the vehicle. The front surface 31 of the second optical member 30 has a plurality of lens elements 33, each serving as a light distributing element. The rear surface 32 of the second optical member 30 is flat, and is perpendicular to the optical axis Ax. The second optical member 30 may not necessarily extend over the entire front surface of the first optical member 20. That is, the second optical member 30 may not be arranged in an area where light diffusion is not necessary.

The lens elements 33 obliquely diffuses the light that has been projected from the diagonal reflecting area of the first optical member 20, and horizontally diffuses the light that has been projected from the horizontal and vertical area (cross area) of the first optical member 20. The "cross area" is a reflection area which, when the lamp is viewed from front, extends in the horizontal and vertical direction of the first optical member 20 from the optical axis Ax as the center. The "diagonal reflecting area" is the other reflection area than the cross area.

A plurality of tabs are provided on the outer peripheral portion of the second optical member 30. Each of the tabs is formed with a screw hole 34. Further, on the rear sides of the tabs, the respective bosses 35 are provided to attach the first optical member 20 to the second optical member 30. When attaching the lamp unit 15 to the bosses 16 of the unit holder 13, the screw holes 32 of the second optical member 30 are aligned with the bosses 16, and the screw holes of the first optical member 20 are aligned with the bosses 35. By inserting the screws through the screw holes 34, the first optical member 20 and the second optical member 30 are fastened to the unit holder 13. The first optical member 20 is attached to the unit holder 13 together with the second optical member 30 such that the light emitting chip 24 extends in the horizontal direction.

As shown in FIG. 3, light rays α1, α2, α3 emitted from the light source 23 and entered the first optical member 20 reach the front surface 21. The light ray α1 directed toward the area near the optical axis Ax with its incident angle being smaller than the critical angle θ0 is internally reflected by the mirrored central reflecting portion 27 toward the back surface 22 of the first optical member 20.

The light rays α2, α3 directed toward an area away from the optical axis Ax with its incident angle being larger than the critical angle θ0 are internally reflected by the outer reflecting portion 29 toward the back surface 22 of the first optical member 20. In this manner, the light rays α1, α2, α3 having reached the front surface 21 of the first optical member 20 are internally reflected toward the back surface 22 without substantially leaking from the front surface 21.

The front surface 21 of the first optical member 20 is flat, and is perpendicular to the optical axis Ax. Thus, the light reflected toward the back surface 22 of the first optical member 20 is a set of divergent light rays having a virtual light source at a position on the optical axis Ax symmetrical to the light emitting chip 23 with respect to the front surface 21 of the first optical member 20. Further, the back surface 22 of the first optical member 20 is configured as a paraboloid Pr having a focal point at the virtual light source. Thus, the light internally reflected again by the back surface 22 is a set of parallel light rays, and is sent out from the outer reflecting portion 29 of the front surface 21 as the parallel light rays.

As described above, the light source 23 is a semiconductor light emitting device, and the first optical member 20 is configured such that the light from the light source 23 is internally reflected twice and is then sent out forwardly. Therefore, the size of the first optical member 20 in the front-rear direction is small.

The central reflecting portion 27 of the front surface 21 of the first optical member 20 having the mirrored surface 28 has a circular shape, and the incident angle of the light from the light source 23 at the position of the outer boundary of the central reflecting portion 27 is substantially equal to the critical angle θ0 or is slightly larger than the critical angle θ0. According to this configuration of the central reflecting portion 27, the blocking amount of the light reflected by the back surface 22 of the first optical member 20 is suppressed, so that the efficiency of use of the light from the light source 23 is improved.

The light rays α1, α2, α3 exited from the outer reflecting portion 29 of the front surface 21 of the first optical member 20 enter the flat rear surface 32 of the second optical member 30, and are sent out in a diffused manner from the front surface 31 formed with the lens elements 33. Each of the lens elements 33 is configured as a light distributing element. The light projected from the diagonal reflecting area of the first optical member 20 is obliquely diffused by the lens elements 33. The light projected from the cross area of the first optical member 20 is horizontally diffused by the lens element 33. Accordingly, the second optical member 30 can be configured to form, for example, a low beam light distribution pattern.

Figure 4:
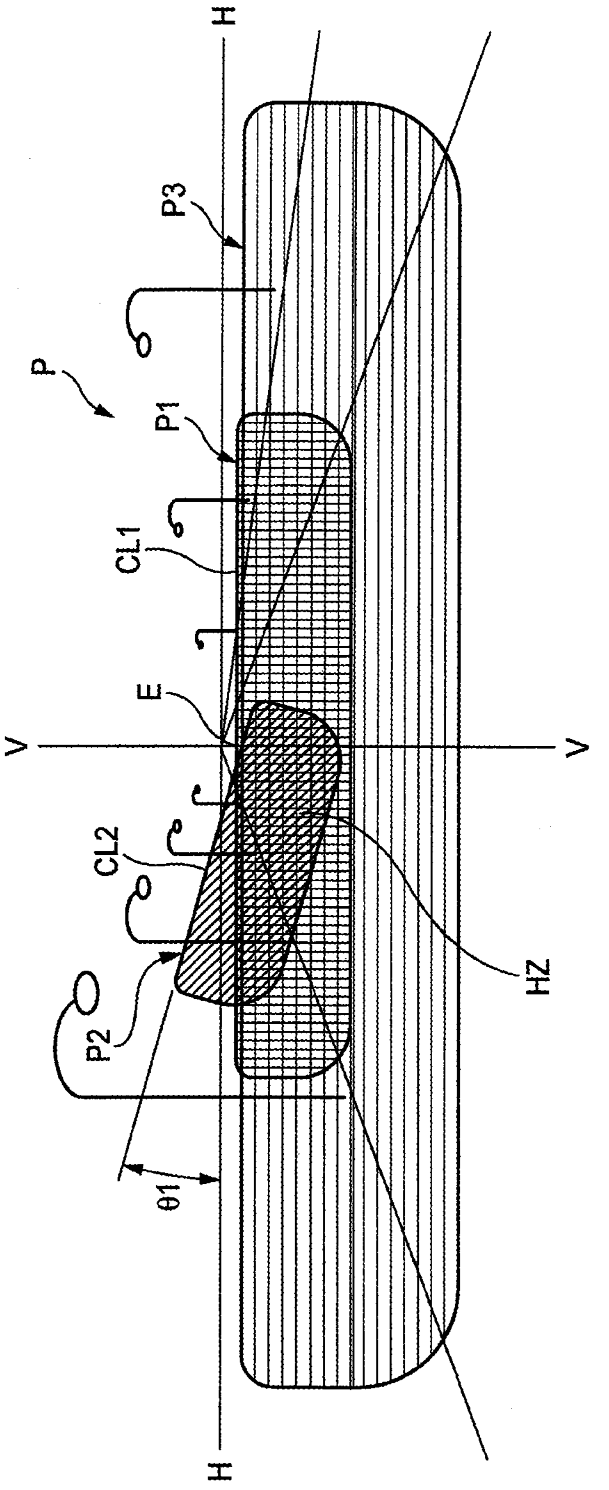
FIG. 4 is a perspective diagram illustrating a light distribution pattern to be formed on a virtual vertical screen by light irradiated forwardly from the lamp unit.

FIG. 4 is a perspective diagram of a light distribution pattern P formed on a virtual vertical screen disposed 25 m ahead by the light forwardly irradiated from the vehicle headlamp 10. The light distribution pattern P is formed by the lens elements 33 of the second optical member 30 shown in FIG. 1.

This light distribution pattern P is a low beam light distribution pattern for the left hand traffic. The upper end of the light distribution pattern P has a horizontal cutoff line CL1 extending horizontally and an oblique cutoff line CL2 extending from the horizontal cutoff line CL1 in the upper left direction at a given angle of θ1. In the lower left region adjacent to the elbow point E, i.e. a point of intersection between the horizontal cutoff line CL1 and oblique cutoff line CL2, there is formed a hot zone HZ which is a high luminous intensity zone.

The low beam light distribution pattern P is a composite light distribution pattern in which the horizontal cutoff line forming pattern P1, an oblique cutoff line forming pattern P2 and a diffusion area forming pattern P3 are combined.

As described above, the vehicle lamp according to this exemplary embodiment includes the first optical member 20 disposed in front of the light source 23 and the second optical member 30 disposed near the front surface 21 of the first optical member 20, and the second optical member 30 is configured to diffuse the light from the first optical member 20 to form a given light distribution pattern. Thus, the first optical member 20 can be used for multiple specifications, the second optical member 30 can be changed in accordance with different specifications. Accordingly, compatibility of the lamp structure can be improved.

Figure 5A:
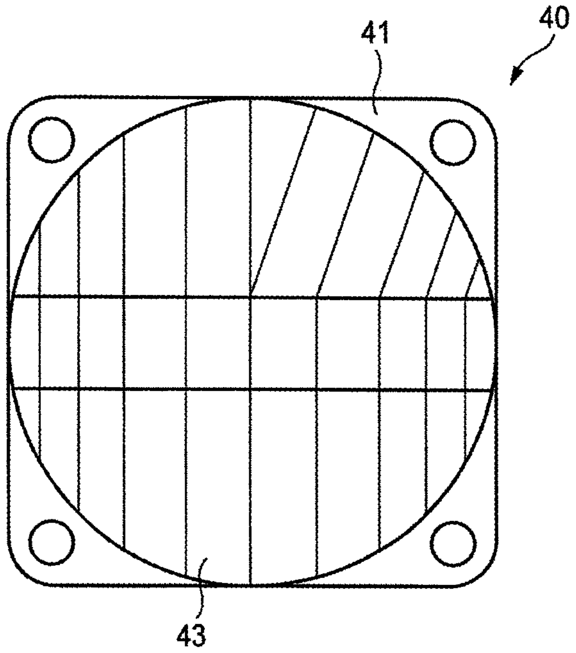
FIG. 5A is a front view of another example of a second optical member.
Figure 5B:
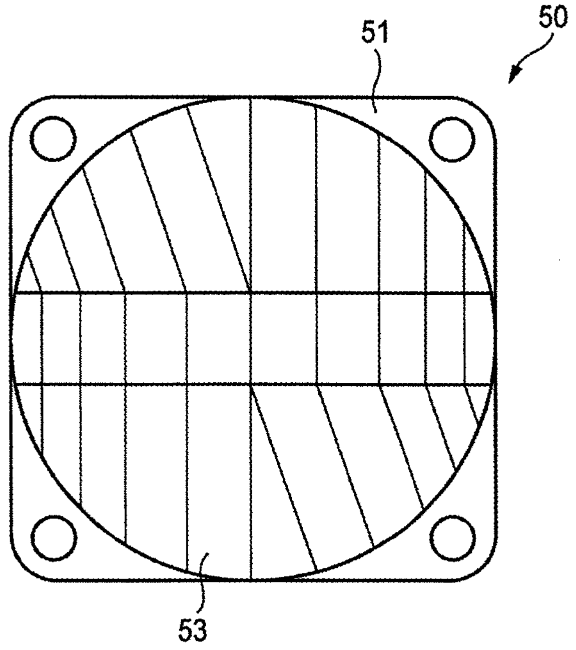
FIG. 5B is a front view of yet another example of a second optical member.

For example, when a second optical member 40 shown in FIG. 5A having lens elements 43 on the front surface 41 is used in place of the second optical member 30 shown in FIG. 1, the lamp unit can be adapted to a specification for the right hand traffic. Further, when it is replaced with a second optical member 50 shown in FIG. 5B having lens elements 53 on the front surface 51, the lamp unit can be adapted to another specification.

The front surface 21 of the first optical member 20 includes the central reflecting portion 27 having the mirrored surface 28 around the optical axis Ax, and the outer reflecting portion 29 around the central reflecting portion 27. The light of the light source 23 is internally reflected by the front surface 21 toward the back surface 22, internally reflected again by the back surface 22 toward the outer reflecting portion 29, and is diffused by the second optical member 30 to form a given light distribution pattern, for example, a low beam light distribution. That, the light of the light source 23 is internally reflected to form a given light distribution pattern efficiently, so that the efficiency of use of the light from the light source 23 can be improved.

The light from the diagonal reflecting area of the first optical member 20 is obliquely diffused by the second optical member 30, and the light from the horizontal and vertical areas of the first optical member 20 is horizontally diffused by the second optical member 30. Accordingly to this configuration of the second optical member 30, a low beam light distribution pattern can be formed.

Next, a second exemplary embodiment of the present invention with be described with reference to FIG. 6. Here, the same structures as in the first exemplary embodiment are given the same reference numerals.

Figure 6:
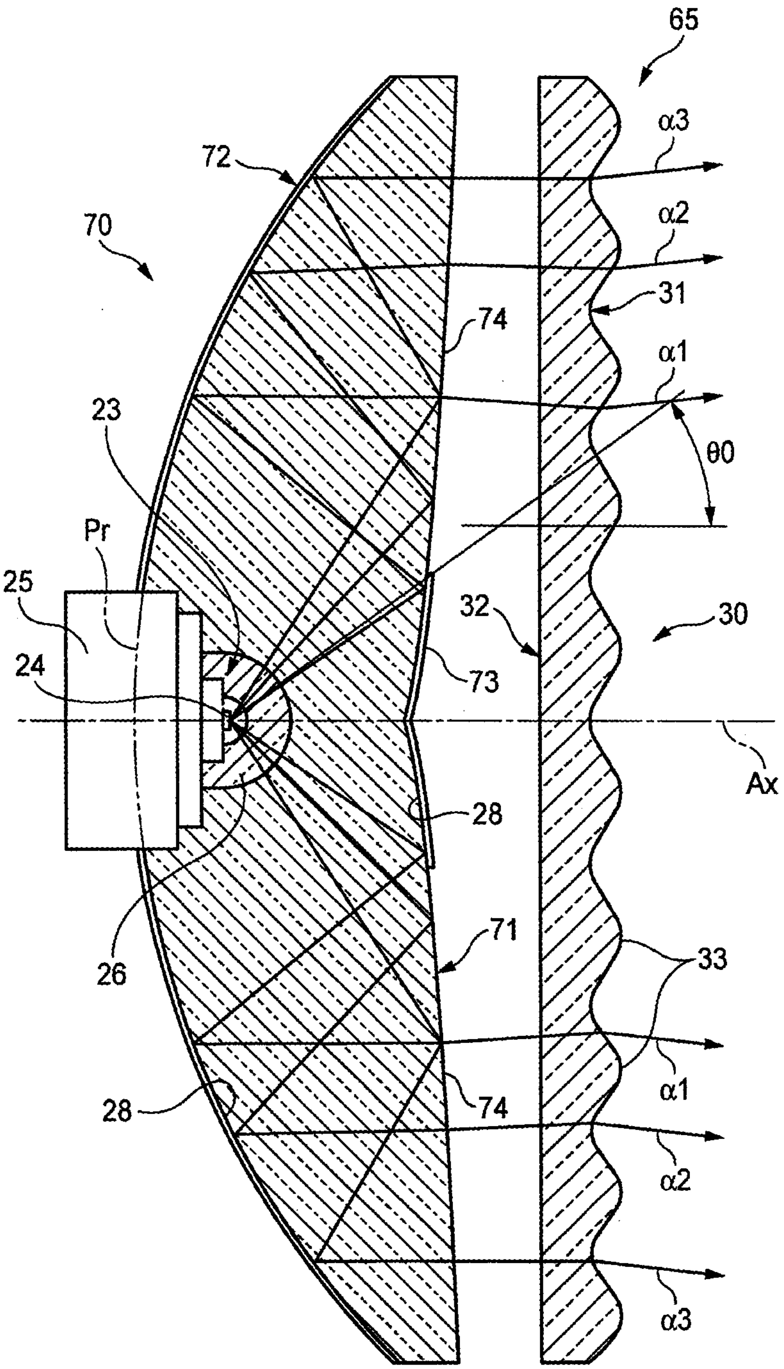
FIG. 6 is an enlarged view of a portion of a lamp unit according to a second exemplary embodiment of the present invention.

As shown in FIG. 6, a lamp unit 65 according to the second exemplary embodiment is different from the first optical member 20 of the first exemplary embodiment in the structure of a first optical member 70. A central reflecting portion 73 and an outer reflecting portion 74 of a front surface 71 of the first optical member 70 are curved such that, in the radial direction from the optical axis Ax, the central reflecting portion 73 and the outer reflecting portion 74 are protruded toward the second optical member 30.

By arranging the central reflecting portion 73 and the outer reflecting portion 74 in this manner as a continuous convex surface, the reflection area (total reflection area) of the annular outer reflecting portion 74 can be increased, and the reflection area (light shielding area) of the central reflecting portion 73 near the optical axis can be reduced accordingly. This can reduce the size of a non-light-emitting portion on the front surface 71. While the curved shape of the front surface 71 changes the inclination direction of a projection image by the first optical member 70, the configuration of the second optical member 30 and/or the back surface 72 of the first optical member 70 can be modified accordingly to form a given light distribution pattern.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims. For example, while the lamp units 15, 65 of the exemplary embodiments described above are adapted to form a low beam light distribution, it can be modified to form other light distribution patterns, such as a high beam light distribution.

Further, while the back surface 22, 72 is configured as the mirrored surface 28 to reflect the light forward in exemplary embodiments described above, the light may instead be reflected by a reflecting surface of a paraboloid reflector having a center at the optical axis Ax extending in front-rear direction of the vehicle. In this case, the light source 23 may be disposed at the focal point of the paraboloid such that the planar light emitting portion of the light source 23 faces the reflecting surface of the reflector. This also allows an effective use of the light from the light source 23.

Further, while the central reflecting portion 27, 73 of the front surface 21, 71 of the first optical member 20, 70 near the optical axis has the mirrored surface 28 in the exemplary embodiments described above, a small lens portion may be provided in place of the mirrored surface 28. According to this configuration, a light shielding area does not exit so that the light from the light source 23 can be projected forwardly from the area near the optical axis.

Further, while the lamp unit 15, 65 of the exemplary embodiments described above are configured to form a given light distribution pattern by a single unit using a single light source 23, a plurality of lamp units may be provided to form a light distribution pattern, e.g., a low beam light distribution using a plurality of light sources.

What is claimed is:

1. A vehicle lamp comprising:

a semiconductor light emitting device arranged to face toward a front of the vehicle lamp;

a first optical member disposed in front of the semiconductor light emitting device; and a second optical member disposed in front of the first optical member, wherein the first optical member comprises a front surface and a back surface, wherein the front surface is configured to internally reflect light from the semiconductor light emitting device toward the back surface, wherein the back surface is configured to internally reflect the light reflected by the front surface back toward the front surface such that the light exits the first optical member from the front surface, and wherein the second optical member is disposed directly in front of the front surface of the first optical member and diffuses the light from the first optical member to form a light distribution pattern;

wherein a front surface of the second optical member includes a plurality of lens elements inclined with respect to a vertical direction and a horizontal direction that are configured to obliquely diffuse a portion of the light from the first optical member and a plurality of vertical lens elements that are configured to horizontally diffuse another portion of the light from the first optical member, so as to form a low beam light distribution pattern.

2. The vehicle lamp according to claim 1, wherein the front surface of the first optical member comprises:

a central reflecting portion comprising a mirrored surface around an optical axis extending in a front-rear direction of the vehicle lamp; and an outer reflecting portion formed around an outer periphery of the central reflecting portion and in an area where the light from the semiconductor light emitting device is totally internally reflected, wherein the back surface of the first optical member internally reflects the light toward the outer reflecting portion.

3. The vehicle lamp according to claim 2, wherein the outer reflecting portion is curved such that, in a radial direction from the optical axis, the outer reflecting portion is protruded toward the second optical member.

4. The vehicle lamp according to claim 1, wherein the first optical member comprises a recess on a back side of the first optical member, wherein a light emitting center of the semiconductor light emitting device is surrounded by the recess.

5. The vehicle lamp according to claim 1, wherein the second optical member comprises a plurality of lens elements.

6. The vehicle lamp according to claim 1, wherein the first optical member and the second optical member are fastened to each other to form a lamp unit together with the semiconductor light emitting device.

7. The vehicle lamp according to claim 6, further comprising:

a lamp body having a front opening; and a transparent cover attached to the lamp body to cover the front opening of the lamp body, wherein the lamp unit is arranged inside a lamp chamber formed by the lamp body and the transparent cover.

8. The vehicle lamp according to claim 7, further comprising a unit holder to which the lamp unit is fastened, wherein the unit holder is supported by the lamp body such that an angle of the unit holder with respect to the lamp body is adjustable.

9. The vehicle lamp according to claim 1, wherein the semiconductor light emitting device comprises a light emitting chip and a semispherical member covering the chip.

10. The vehicle lamp according to claim 9, wherein the front surface of the first optical member comprises a central reflecting portion comprising a mirrored surface around an optical axis extending in a front-rear direction of the vehicle lamp.

11. The vehicle lamp according to claim 2, wherein the semiconductor light emitting device comprises a light emitting chip and a semispherical member covering the chip.

12. The vehicle lamp according to claim 1, wherein the second optical member extends over an entire front surface of the first optical member.

13. The vehicle lamp according to claim 9, wherein the second optical member extends over an entire front surface of the first optical member.

* * * * *